United States Patent [19]

Horikawa

[11] Patent Number: 4,633,073
[45] Date of Patent: Dec. 30, 1986

[54] DATA CORRECTING DEVICE IN AN AUTOMATIC FOCUS DETECTING SYSTEM

[75] Inventor: Yoshiaki Horikawa, Hachiouji, Japan

[73] Assignee: Olympus Optical Co., Ltd., Tokyo, Japan

[21] Appl. No.: 582,736

[22] Filed: Feb. 23, 1984

[30] Foreign Application Priority Data

Feb. 24, 1983 [JP] Japan .................... 58-28599

[51] Int. Cl.⁴ .................... G01J 1/36
[52] U.S. Cl. .................... 250/201; 250/204; 354/403; 354/406
[58] Field of Search ...... 250/201 R, 201 PF, 201 AF, 250/201 DF, 204, 209; 354/402, 404–407, 409, 403; 356/1, 4, 125, 126

[56] References Cited

U.S. PATENT DOCUMENTS

| 3,906,219 | 9/1975 | Stauffer | 354/404 |
| 4,078,171 | 3/1978 | Stauffer | 250/201 |
| 4,201,456 | 5/1980 | Wolbarsht | 354/404 |
| 4,350,884 | 9/1982 | Vollath | 250/201 PF |

Primary Examiner—Edward P. Westin
Attorney, Agent, or Firm—Cushman, Darby & Cushman

[57] ABSTRACT

An automatic focus detecting device comprising a photoelectric converting device formed by arranging many elements, a pupil divider capable of forming two object images on the photoelectric converting device through different light paths, a device capable of detecting an in-focus position by processing two image data obtained as output signals from the photoelectric converting device, a device for determining the reciprocal numbers of the output signals obtained by applying a uniform light onto the photoelectric converting device and a device for receiving the image data to correct the signals for output multiplying the image data by these reciprocal numbers in order to enable accurate focusing. The photoelectric converting device is so arranged as to receive the light having passed through an infrared cut filter or a band pass filter.

4 Claims, 18 Drawing Figures

FIG. 8
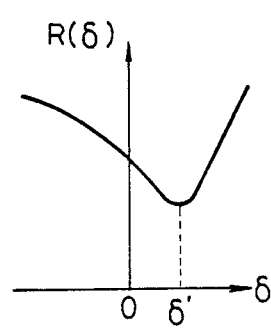
FIG. 9
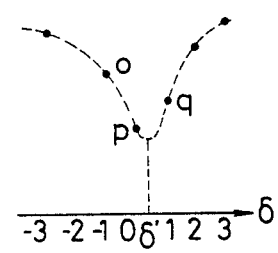
FIG. 10
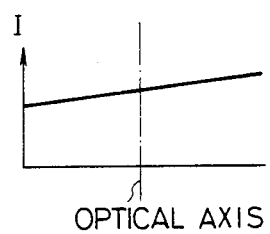
IMAGE DATA A
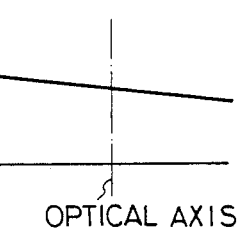
IMAGE DATA B

DATA CORRECTING DEVICE IN AN AUTOMATIC FOCUS DETECTING SYSTEM

BACKGROUND OF THE INVENTION (a) Field of the invention:

This invention relates to an automatic focus detecting device for such optical systems as microscopes and cameras and more particularly to an automatic focus detecting device wherein object images are received by a photoelectric converting device consisting of a plurality of elements, an output signal representing the received light amount is obtained from the respective elements and the detection of whether an object image formed is in-focus or not is performed on the basis of these output signals.

(b) Description of the prior art:

Among conventional automatic focus detecting devices of this kind, there are a range finder type wherein a trigonometric measurement is applied and a TTL system wherein a light pencil passing through a pupil is divided to obtain two images. In either of them, correlation of two images is digitally determined to detect which, the coincidence of the two images is indicated with the maximum of the correlative value and the relative movement amount of the two images is indicated by the phase difference amount of the images.

FIG. 1 shows an example of such conventional automatic focus detecting devices. The data A and B of two images picked up by an image sensor not illustrated are memorized respectively in ring-shaped shift registers 1a and 1b through a sample holding circuit, A-D converter (not illustrated either) and others. In this example, the image data are formed of 128 elements. When both image data A and B are addressed respectively in the shift registers 1a and 1b, then the absolute values of the differences of the respective elements will be determined by circuits 2 for determining the absolute values of the differences and further the sum of the absolute values will be determined by an adding machine 3 to obtain the correlative value of two images. Then, the image data B of the shift register 1b will be shifted by 1 element by a pulse from a clock CL and again the correlative value will be determined by the circuit 2 and adding machine 3. Thus, whenever the image data on one hand are shifted in turn by the clock CL, the correlative value will be determined, further the extreme value of the correlative value will be determined by a peak detector 4 and the position in which the extreme value is detected will be an in-focus position. Also, the clock number in the case of the extreme value will be determined by a counter 5, this clock number, that is, the shifting amount of the image data B of the shift register 1b will be the phase difference amount of the two images and the direction and amount of the de-focus will be able to be known from the phase difference amount.

However, in this conventional device, as the image data obtained by the image sensor are used as it is, in case the light amounts of two image data are not uniform due to the eccentricities of an optical system and/or the pupil or in case the light amount distributions of two image data are not uniform due to a difference of position between a pupil divider and the pupil, there are such problems that a wrong focusing will be performed, the focusing becomes impossible or the like. Further, in an automatic focus detecting device of the other type than the two images coincidence type, in which a pair of image sensors is placed before and behind an image forming plane and the balance between the light amounts to be received by both image sensors is detected to focus, there are the same problems as described above.

SUMMARY OF THE INVENTION

A primary object of the present invention, in view of the above mentioned circumstances, is to provide an automatic focus detecting device wherein accurate focusing can be always carried out even in case the light amounts of two image data become uneven due to the eccentricities of the optical system and/or pupil or the positions of the pupil divider and pupil do not coincide with each other and the light amount distributions of the two image data become non-uniform.

According to the present invention, this object is attained by providing an image forming lens, a pupil divider arranged rotatably in the position or vicinity of the pupil of the image forming lens and having a light passing part thereon, a photoelectric converting means made by arranging many elements and capable of receiving two object images to be formed by the image forming lens and pupil divider and converting the two object images respectively to photoelectric output signals, a detecting circuit means connected to the photoelectric converting means and capable of detecting the relative positions of the two object images on the basis of the photoelectric output signals from the photoelectric converting means, a means for determining the reciprocal numbers of the output signals obtained when a light is uniformly applied onto the photoelectric converting means and a means of multiplying the above mentioned photoelectric signals by the reciprocal numbers to correct the above mentioned photoelectric output signals.

According to the present invention, the reduction of the focusing precision caused by the eccentricity of the optical system or pupil and/or the slip of the position of the pupil and the position of the pupil divider from each other can be eliminated.

This and other objects of the present invention will become more apparent during the course of the following detailed description and appended claims.

BRIEF DESCRIPTION OF THE DRAWINGS

FIGS. 8 and 9 are respectively views showing a phase difference computing method high in the precision near the infocus point;

FIG. 10 is a view showing the unevenness of light amount of the image data in the above mentioned embodiment;

DESCRIPTION OF THE PREFERRED EMBODIMENTS

Figure 2A:
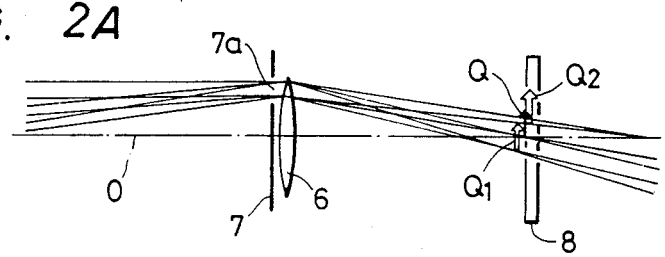
FIGS. 2A and 2B are respectively views showing the principle of a pupil dividing method used in an embodiment of the automatic focus detecting device according to the present invention.
Figure 2B:
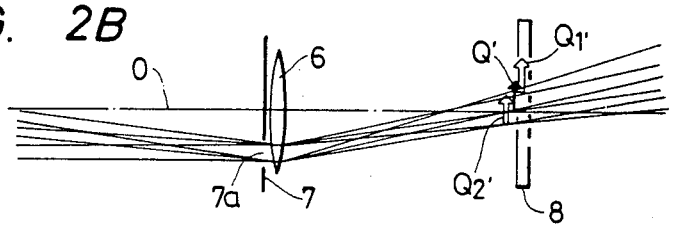

The present invention shall be explained in the following on the basis of the embodiment shown in FIGS. 2A to 14. FIGS. 2A and 2B show the principle of the pupil dividing method used in this embodiment. In FIG. 2A, the reference numeral 6 denotes as image forming lens, 7 denotes a light intercepting plate having an aperture 7a arranged near a pupil on the front side (object side) of the image forming lens 6 and 8 denotes an image plane. When in focus, an image Q will be formed on the image plane 8 but, when out of focus, obscure images $Q_1$ and $Q_2$ will be formed on the image plane 8 respectively in the positions shifted in the reverse directions in the direction perpendicular to an optical axis 0 with respect to the image Q depending on whether the position of the focus is on the front side or the rear side of the image plane 8. FIG. 2B shows the case that the aperture 7a of the light intercepting plate 7 is moved to the reverse side with respect to the optical axis 0. When in focus, an image Q' will be formed on the image plane 8 but, when out of focus, obscure images $Q_1'$ and $Q_2'$ will be formed on the image plane 8 depending on whether the position of the focus is on the front side or the rear side of the image plane 8. Therefore, if the aperture 7a of the light intercepting plate 7 is moved, for example, from the position in FIG. 2A to the position in FIG. 2B, when in focus, the images Q and Q' will not move but, in case the position of the focus is on the front side of the image plane 8, the image will move from the position $Q_1$ to the position $Q_1'$ and, in case the position of the focus is on the rear side of the image plane 8, the image will move from the position $Q_2$ to the position $Q_2'$. If a so-called image sensor is provided on the image plane 8, the state of the image will be able to be measured.

From the above, the discrimination of whether the position of the focus is on the front side or the rear side of the image plane 8 and the amount of the shift of the position of the focus then can be known from the direction and amount of the movement (that is, the phase difference) of the image.

Figure 3:
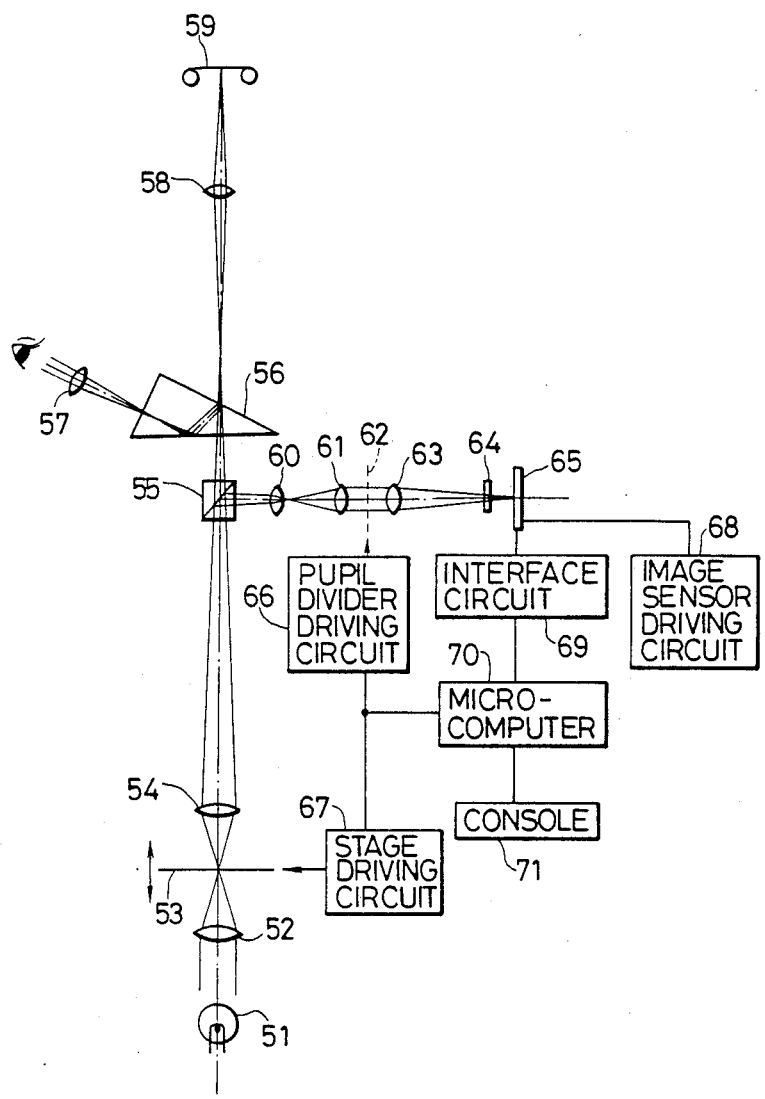
FIG. 3 is a general view of the embodiment of the present invention.

FIG. 3 shows an example in which the above mentioned principle is used in a microscope. Here, the reference numeral 51 denotes a light source, 52 denotes a condenser lens, 53 denotes a stage on which a sample is to be placed and observed, 54 denotes an objective, 55 denotes a beam splitter for leading the light from the light source 51 to a focus detecting optical system, 56 denotes a prism for leading a part of the light to an eyepiece. 57 denotes the eyepiece, 59 denotes a film, 60 denotes a relay lens for leading the light from the beam splitter 55 to the focus detecting optical system, 61 denotes a lens for making a pupil, 62 denotes a pupil divider to be located in the position of the pupil made by the lens 61, 63 denotes an image forming lens for making with the light passing through it an image on a photoelectric converting means or image sensor 65 through a filter 64, 66 denotes a pupil divider driving circuit and 67 denotes a stage driving circuit respectively controlled by a microcomputer 70, 68 denotes an image sensor driving circuit, 69 denotes an interface circuit for putting image data from the image sensor 65 into the microcomputer 70 and 71 denotes a console for making an automatic focus operation, in-focus indication and impossibility indication.

The microcomputer 70 carries out all of a correlation operation and in-focus judgment. A recently developed and marketed LSI solely for computation may be used for the correlation operation.

Figure 4A:
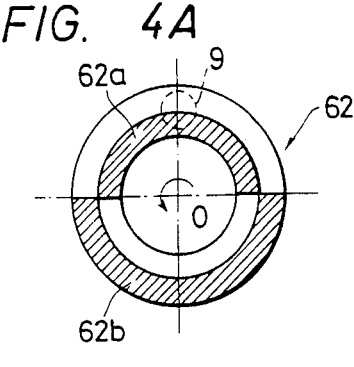
FIGS. 4A and 4B are front views showing concrete examples of pupil dividers used in the embodiment shown in FIG. 3.
Figure 4B:
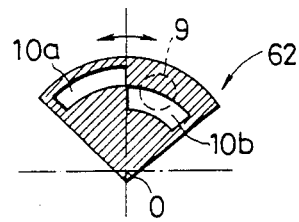

The operations of the respective parts shall be described in detail in the following. FIGS. 4A and 4B show two concrete examples of the pupil divider for dividing a light pencil passing through the pupil to form two images. That is to say, FIG. 4A shows a pupil divider wherein semi-circular arcuate light intercepting parts (hatched parts) 62a and 62b are provided on a transparent glass disk so that, when the disk is rotated around an axis 0, the halves of the pupil 9 will be alternately opened and closed. FIG. 4B shows a sector pupil divider having two arcuate apertures 10a and 10b so that, when the sector is reciprocally rotated around the axis 0, the halves of the pupil will be alternately opened and closed. The case of FIG. 4A is adapted to a method wherein an image is picked up by the image sensor 65 in response to a synchronized signal synchronized with the rotation of the pupil divider while the pupil divider 62 is being rotated. FIG. 4B is adapted to a method wherein an image is picked up by the image sensor 65 in synchronization with the movement of the pupil divider 62 driven by such controlling device as a microcomputer. Thus, with such pupil divider 62 as is described above, the states shown in FIGS. 2A and 2B can be made and the image data in the respective states can be obtained by the image sensor 65.

Further, generally, the object or sample to be focused is not always in the center of the visual field. Therefore, it is desirable that the image sensor 65 covers not only the center of the visual field but also a range as wide as possible. However, if the entire visual field is to be covered, the number of the elements of the image sensor will have to be increased, because, in order to keep the focusing precision constant, the pitch of the elements must be kept with a predetermind largeness.

Figure 5:
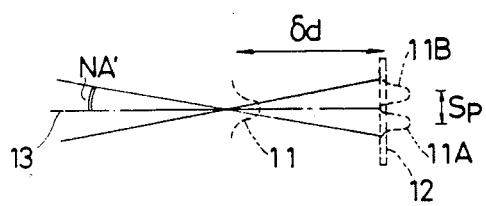
FIG. 5 is a view showing the relations of the phase difference amount and de-focus amount between two images.

This point shall be explained in the following. FIG. 5 is a view showing the relations of the phase difference amount and de-focus amount between two images. Here, in order to simplify the explanation, a spot image shall be considered. The reference numeral 13 denotes the optical axis of an optical system. It is assumed that a spot image 11 is formed by the optical system wherein the numerical aperture of the exit side is NA'. Now, if the image sensor 12 is in the position of a de-focus amount $\delta d$, two images 11A and 11B will be formed with a phase difference Sp and therefore the relation of $\delta d$ and Sp will be $$\delta d = \frac{Sp}{NA'} \quad (1)$$

Now, the focusing precision in the case of using an objective of 10x shall be considered. If the numerical aperture of the objective of 10x is 0.40, the numerical aperture NA' will be 0.04 and $$\delta d = 25 Sp \quad (2)$$

will be derived from the formula (1). On the other hand, the focal depth t of the objective of 10x is represented by $$t = \frac{\epsilon}{NA'} \quad (3)$$

(wherein $\epsilon$ is a permissible circle of confusion). Therefore, if $\epsilon = 0.05$ mm (corresponding to a resolving power of 20/mm), $$t = 1.25 \quad (4)$$

As the focusing precision within this focal depth is required, if $$\delta d = \frac{t}{2} \quad (5)$$

is made, $$\delta d = 0.625 \text{ mm} \quad (6)$$

will be obtained and $$Sp = 26 \ \mu m \quad (7)$$

will be obtained.

In order to obtain this phase difference amount of the image at a high precision, it is necessary that the pitch of the diode arrays of the image sensor 12 should be about 25 μm. As in the above, the pitch of the diode arrays of the image sensor 12 is determined in response to the required focusing precision. In this case, if an image sensor having 128 diode arrays is used, the range which the image sensor 12 can cover will be 128×0.025=3.2 mm which will be so smaller than the visual field number 21 (visual field of a diameter of 21 mm) that the focusing will have to be made by moving the object to be focused to the position (generally the center) of the image sensor.

Figure 6:
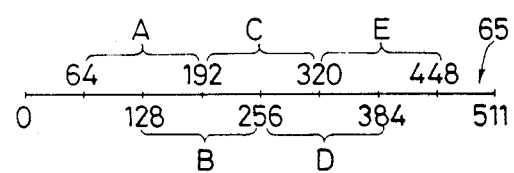
FIG. 6 is a view showing an image sensor of the embodiment shown in FIG. 3 and a processing method therefor.

FIG. 6 shows the image sensor to be used in this embodiment and a method of processing image data picked up. That is to say, in this embodiment, the image sensor 65 having 512 photodiode arrays is used. According to this image sensor, 512×0.025=12.8 mm is made and a considerable part of the visual field can be covered. If the correlation operation is performed by using all the elements (diode arrays), the operation time will be very long and there will be no significance. Therefore, 512 elements are divided into five sections A to E each of 128 elements and the correlation operation is performed in the section highest in the contrast among them.

Here, an example of the contrast computing method shall be explained. Generally, as an evaluating function for evaluating the contrast, in case f(x) denotes an output of the x th element of the sensor 65, $$C = \sum_{x} |f(x) - f(x+1)| \text{ or}$$

$$C = \sum_{x} (f(x) - f(x+1))^2$$

is known. In the case of this embodiment, as different from the focusing by a contrast method wherein it is required to know the variation of the contrast at a high precision, the relative contrast intensity between the respective sections may be known and therefore it is not always necessary to compute the difference between the outputs of two adjacent elements. For example, if $$C = \sum_{x}' |f(x) - f(x+5)|$$

(wherein $$\sum_{x}'$$

signifies to compute x every four elements), the computation of the section A will be $$C = \sum_{x=64}^{184}{}' |f(x) - f(x+5)|$$

$$= |f(64) - f(69)| + \ldots + |f(184) - f(188)|$$

The absolute value of the difference may be added 31 times while being computed. In the conventional computing method, it must be added 121 times.

Figure 7:
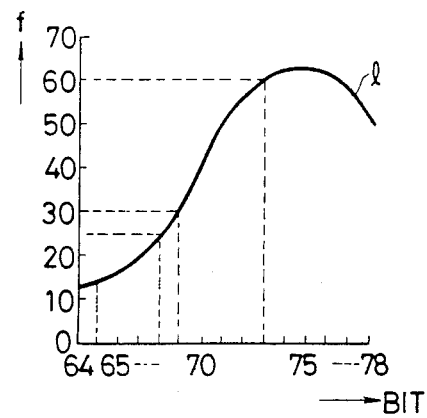
FIG. 7 is a view showing an example of a light intensity distribution on the image sensor.

By the way, the absolute value of the difference between the values of a pair of elements in the positions separated by 5 elements from each other is computed every 4 elements here in order to make the sensitivity of the contrast higher than in merely computing every 4 elements the absolute value of the difference between the values of a pair of elements adjacent to each other. In this respect, for example, in the case of this embodiment, the comparative computation on the basis of the light intensity distribution l on the image sensor shown in FIG. 7 is $$C = |f(64) - f(69)| + |f(68) - f(73)|$$

$$= |13 - 30| + |25 - 60|$$

$$= 52$$

but, in the conventional case, it is $$C' = |f(64) - f(65)| + |f(68) - f(69)|$$

$$= |13 - 14| + |25 - 30|$$

$$= 6$$

Thus, the contrast sensitivity in the case of this embodiment is higher than in the conventional case.

Further, in case, in order to reduce the computation amount, the difference between the values of a pair in the positions separated by X elements from each other is determined and is computed every Y elements, X>Y will be preferable. This embodiment is of X=5>4=Y.

By the way, the data to be used for the above mentioned function f may be either of the image data A and B.

Figure 1:
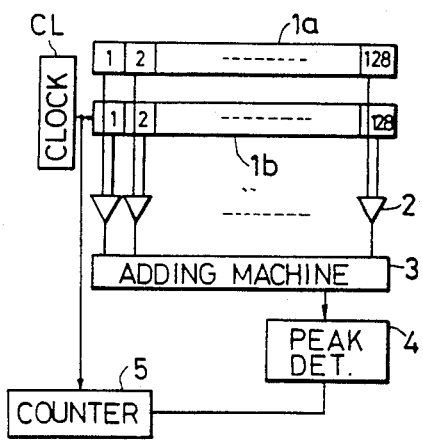
FIG. 1 is a view showing the circuit of the essential part of a conventional automatic focus detecting device.

Thus, the contrasts of the sections A, B, C, D and E are computed by such method as in the above and the best contrast of them is selected. However, here, as evident from FIG. 6, the sections A and B overlap with each other in 128 to 192-elements. Therefore, in order to avoid useless computations, the contrasts of 64 to 128-elements, 128 to 192-elements and 192 to 256-elements may be respectively computed, the contrast of the section A may be made as the sum of the contrasts of 64 to 128-elements and 128 to 192-elements and the contrast of the section B may be made by the sum of the contrasts of 128 to 192-elements and 192 to 256-elements. By the way, the sections A, B, C, D and E respectively overlap with one another by half so that, even in case there is a part in which the image intensity variation is remarkable on the boundary between the sections, the sections including the variation can be designated. For example, in case there is a part in which the image intensity variation is remarkable on the boundary between the sections A and B, that is, near the 192-element, all the information will not be able to be used in the section A or C but, if the section B is designated, all the information will be well included in the sections B. The time required for the operation for determining the contrast may be so shorter than for the correlation operation that the operation time of this embodiment may be the correlation operation time of only the 128-element+about $\alpha$ time. Further, sections are not formed respectively for 64 elements on both sides so that, in the case of computing the correlation by shifting the images, what is described in FIG. 1 may not occur.

When the processing is performed as in the above, even if the object or sample to be focused is not always in the center of the visual field, the part (section) in which the image of the object to be photographed is located will be automatically selected and the focus will be detected. For the above, it is not necessary to determine a specific section and a part including the photodiode arrays required for the correlation operation may be selected by the contrast or the like from among the many photodiode arrays of the image sensor arranged to cover the greater part of the visual field. Also, a mark or the like may be provided in the observing visual field so as to be manually set. Thus, even if a cubic sample or dust is in the visual field, the object desired to be focused will be able to be focused.

The entire operation shall be explained in the following. First of all, the two image data A and B from the image sensor 65 in FIG. 3 are stored in the memory of the microcomputer 70 through the interface circuit 69. The section highest in the contrast is selected from among the five sections and the correlation is operated by the image data of the selected section. It is now assumed in the explanation that the section A in FIG. 6 is selected.

The correlation operation is performed while relatively shifting by one by one element the image data A and B corresponding to the two images stored in the memory and by how many elements the image data are shifted to overlap the images with each other is judged to determine the phase difference amount of the images. The correlation formula is, for example, $$R(\delta) = \sum_{x=64}^{191} ABS\{f_A(x) - f_B(x + \delta)\} \quad (8)$$

where ABS represents an absolute value and the functions $f_A(x)$ and $f_B(x)$ represent respectively the values of the x th element of the image data A and B. On a set of the functions $f_A$ and $f_B$, $\delta$, that is, $\delta'$ of when $\delta$ is varied until $R(\delta)$ becomes minimum is made a phase difference. Also, in this example, $-64 < \delta < 64$. The range of this $\delta$ can be made so narrow near the in-focus point that the operation time becomes short.

The actual value of $\delta$ takes only the value of each element of the image sensor. Therefore, in order to detect the focus more precisely, a discrete value of the correlation are approximated with a curve fitting or the like to determine the phase difference between the images at a precision less than 1 element (FIG. 8) or a secondary curve can be approximated by using $\delta$, that is, $\delta'$ of when $R(\delta)$ is minimum and three points o, p and q in front and rear of $\delta'$ to determine the phase difference (FIG. 9).

As a result of the above, the operation time may be hardly increased while covering the greater part of the visual field and maintaining the focusing precision.

In the above mentioned example, as $\delta$ is in the range of $-64$ to 64, the de-focus amount in this range will be $0.625 \times 64 = 40$ mm from the formula (6) and will be $40/10^2 = 0.4 = 400$ μm on the objective side and therefore the de-focus amount will be $\pm 400$ μm. In case a de-focus amount in $\delta$ range wider than the range of $-64$ to 64 is to be put into the detecting range, it will be considered to increase the range of $\delta$ but it is not preferrable because the computation range will increase. Further, in case the de-focus amount is so large, even if such highly precise computation as is mentioned above is performed, there will be no significance.

Therefore, in this embodiment, the contrast and correlation are computed by using data every several elements within the data taken in as image data. Concretely, it may be considered that, if data are to be used every 5 elements, f(0), f(5), f(10), f(505), f(510) among the data f(0), f(1), f(2), ... f(510), f(511) will be only data to be used. Practically, only the data of every 5 elements are used at the time of computation. For example, the formula (8) will be like $$R(\delta) = \sum_{n=0}^{64} |f_A(96 + 4n) - f_B(96 + 4n + \delta)| \quad (9)$$

In this case, the de-focus amount will be so large and the image will be so obscure that there will be only low frequency components and therefore the block will not be divided. However, in this case, the section may be divided if necessary. The variation amount of $\delta$ in this case is computed every 5 elements. Therefore, even in case the range of $\delta$ is made, for example, $-200 \leq \delta \leq 200$, the times of the correlation computation may be so few as to be 81 times. The detecting range will be $\pm 1.25$ mm.

As in the above, when the image data are used every several elements, the detecting range will be widened without increasing the computation amount. Thus, when the de-focus amount is large, if the focus position is brought into near the image plane by the computation every several elements and then the computation taking the above described precision into consideration is performed, an automatic focus detection will be able to be carried out over a wider range and with a higher precision.

Further, in case the de-focus amount is large, the stage may be moved while computing only the contrast from the image data and when the contrast becomes a predetermined value, the focusing by the correlation may be performed. In this case, if the contrast is not above the predetermined value, the correlation computation will be likely to compute a wrong image phase. Therefore, this predetermined value may be used as a judging criterion for judging whether the carrelation should be computed or not.

By the way, it is needless to say that, in the case of a focusing device by moving such objective optical system as of a camera, the optical system should be arranged so as to be driven.

Figure 11A:
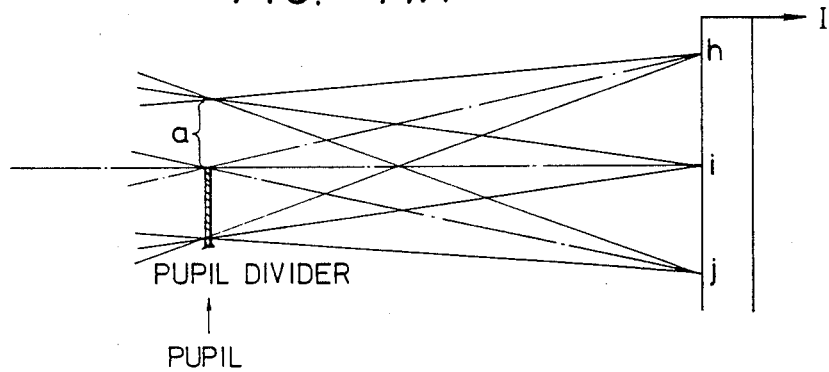
FIGS. 11A and 11B are respectively views for schematically explaining the unevenness of light amount.
Figure 11B:
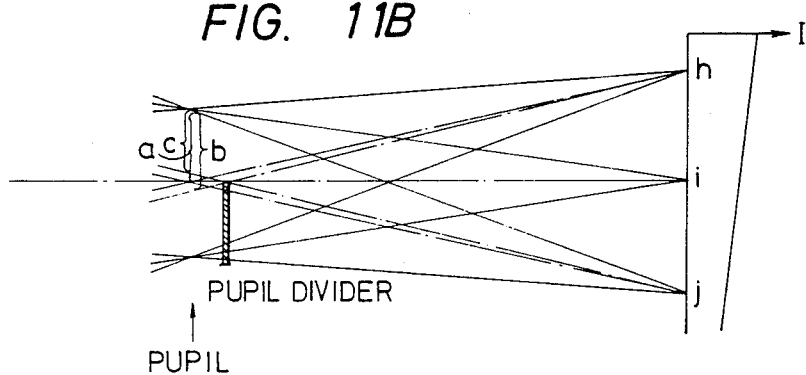

In the case of the above mentioned embodiment, as the light pencil passing through the pupil is divided to obtain two images, in some case, the light amounts of the image data A and B may be different from each other due to the eccentricities of the optical system and/or pupil. Particularly, if the focusing system is of an attachment type, trouble will be likely to occur. Further, in case the pupil divider is not in the pupil position, the light amounts of the image data will be uneven as in FIG. 10. FIGS. 11A and 11B are views for schematically explaining such uneven light amounts. In the case of FIG. 11A, as the pupil and pupil divider coincide with each other, for the respective image heights h, i and j, the light amounts passing through the pupil are all equal to a. In the case of FIG. 11B, as the pupil and pupil divider do not coincide with each other, for the respective image heights h, i and j, the light amounts passing through the pupil will be respectively b, a and c and will be non-uniform and a light amount unevenness will be produced.

If there are a light amount difference and light amount unevenness as in the above, the similarity of the two images of the image data A and B will deteriorate and the precision as a result of the correlation processing will much reduce. Therefore, the correction will be required here. An example of the correcting method is a method used often to remove the fixed pattern noise of the image sensor. It is a method wherein the image sensor is exposed to a uniform light in advance to obtain image data. If the incident light is uniform, the image data will become a fixed pattern noise itself. Therefore, if a correction coefficient is made of its reciprocal number, then the influence of the fixed pattern noise will be able to be removed by multiplying the image data by the correction coefficient. In the case of this embodiment, if the image data A and B are obtained with a uniform light passed through the focusing optical system, the image data A and B will become data having uneven light amounts as in FIG. 10 due to the eccentricity or the like. Therefore, if a correction coefficient is made of the reciprocal number of the like and the same processing is performed, the influence of the light amount unevenness will be able to be removed. Even in case there is a light amount difference, if the same processing is effected through the focusing optical system, the same effect will be able to be obtained and incidentally the fixed pattern noise of the image sensor will be removed. As a concrete method of exposing the image sensor to a uniform light, the method wherein the image data are put in while no sample is placed on the stage 53 is simple.

Figure 12:
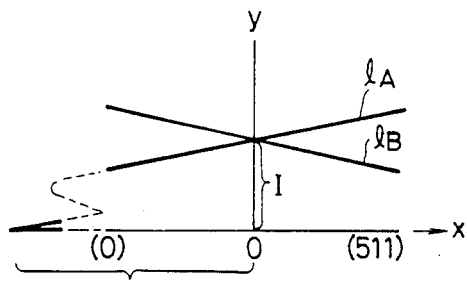
FIG. 12 is a view showing a method for correcting the unevenness of light amount.

As in the above, in the above mentioned correction, it is necessary to once put in the data with a uniform light. This is not a troublesome operation. However, in case the correcting data are not desired to be put in, the correction will be able to be carried out by computation. FIG. 12 is a view for explaining such method wherein the x-axis is taken in the direction of arranging the sensor arrays and the y-axis is taken in the direction of the intensity of the image data. As understood from the explanation of FIG. 10, the values of the image data A and B can be considered to be a straight line having a fixed gradient. Now, if the values of the image data A and B are respectively $l_A$ and $l_B$, the gradient of the value $l_A$ of the image data A is $\beta_A$ and the average value of the value $l_A$ is $I_A$, the formula relating to the image data A will be $$y = \beta_A x + I_A$$

Here, the gradient $\beta_A$ varies with the light amount but can be determined from a constant K by introducing the constant K to be $\beta_A = I_A/K$. The constant K will be determined by the characteristics of the optical system and may be measured in advance. If the average of the light amounts of the image data A and B is $I_{all}$, the correction coefficient $\alpha$ will be $$\alpha = \frac{I_{all}}{\frac{I_A}{K} x + I_A} = \frac{I_{all}}{I_A} \cdot \frac{1}{\frac{x}{K} + 1}$$

Thereby, the light amount difference and light amount unevenness can be corrected.

As in the above, the influence of the eccentricities of the optical system and/or pupil and the influence by the non-coincidence of the positions of the pupil and pupil divider can be corrected and removed by using a uniform light or by computation. As a result, the focusing precision will improve and the detecting range will expand. Further, the in-focus detecting unit can be used in an attachment type. The greatest effect is that various kinds of objectives of various magnifications different in the pupil position can be used.

Figure 13:
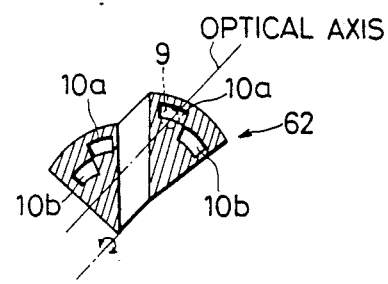
FIG. 13 is a perspective view of another pupil divider.

If many kinds of objectives as in microscopes are used, the pupil position will be different with the respective objectives and therefore it will be difficult to correctly set the pupil divider in the pupil position for all the objectives. As a method for solving this difficulty, there is a method wherein respective pupil dividers are provided in the pupil positions of the respective objectives. It is needless to say that, in this case, the formation is so made that, while one pupil divider is being used, the other pupil dividers never cut the light passing through the pupil. For example, as shown in FIG. 13, two of the same pupil dividers as are shown in FIG. 4B may be used as connected with each other.

In FIG. 3, the filter 64 is an infrared cut filter or a band pass filter and is available to prevent the shift of the focal point by the reason that the spectrum sensitivity and spectrum distribution of the image sensor 65 and light source are different from the luminous efficiency.

Figure 14:
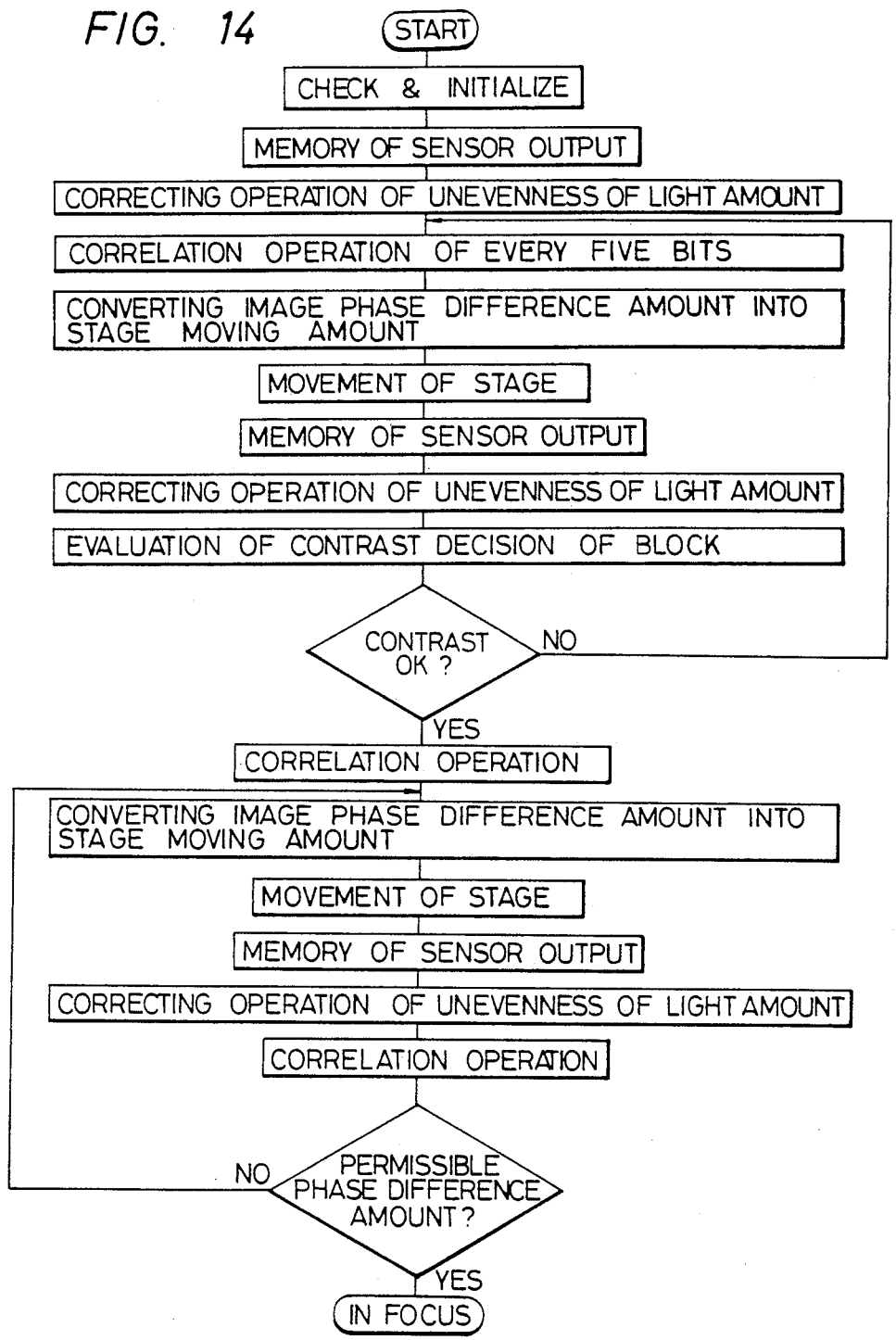
FIG. 14 is a flow-chart showing a method of control and operation process by a computer of the above mentioned embodiment.

In the case of making such control of the automatic focusing device and such operation processing as in the above, the method by a microcomputer and operation processing unit is easiest to design and is cheapest. In this respect, an additional explanation shall be made with the flow-chart in FIG. 14 showing the most fundamental case. When the focusing operation is started, first of all, whether the state of the microscope is adapted to the focusing operation or not is checked and the kind and magnification of the objective are discriminated, because, in the case of correcting the light amount unevenness, the parameter will be different depending on the kind and magnification of the objective to be used and the conversion coefficient for converting the phase difference amount between two images to the moving amount of the stage will be different depending on the magnification [See the formula (1)]. Next, the data of the funcations $f_A$ and $f_B$ are obtained from the image sensor to be stored in the memory. After this, the correction of the light amount unevenness is performed and the data are stored again in the memory. Since the image may be largely out of focus when the focusing operation is started, the focus position is approximately determined by the correlation computation of every 5 elements (See the formula (9)). Then, the phase difference amount between two images determined by the correlation is converted to a moving amount of the stage and the stage is moved. Then again the data of the functions $f_A$ and $f_B$ are obtained and the correction is performed. Then the block is determined by the contrast evaluation. Unless the contrast is above the predetermined value, the reliability of the result by the correlation will be low. Therefore, once again the 5-element correlation is performed to make the stage approach the focus position. Even if such operation is effected several times, in case the contrast does not rise, the contrast of the sample will be too low and therefore the impossibility indication will be made. If the contrast is above the predetermined value, the correlation will be computed in the selected block and the stage will be moved to the in-focus position. To confirm the in-focus state, once again the functions $f_A$ and $f_B$ are obtained and the correlation is computed. Here, if the phase difference amount between two images is of a value within the focal depth, the image will be in focus and the stage will no longer move. If it is without the focal depth, once again the same operation with be repeated.

The above is an explanation of the most fundamental operation. Safety measures for such failures as in the case that there is no sample or in the case that the machine fails are considered in the actual program.

Also, the phase difference amount between two images may be used to judge the change-over from the 5-element correlation to the 1-element correlation. Though the range of $-200 \leq \delta \leq 200$ is computed every 5 elements in the case of the above example, if $\delta$ at which the correlation $R(\delta)$ takes the minimum value is $-200 \leq \delta' \leq 200$, the 1-element correlation will be performed after the stage has moved out of that range. In this case, the judging condition had better be set to be rather small by the range of $\delta$ computed to be $-180 \leq \delta' \leq 180$, because, in case the de-focus amount is large, $\delta$ taking the minimum value may be determined by mistake due to the noise or the like.

Figure 15:
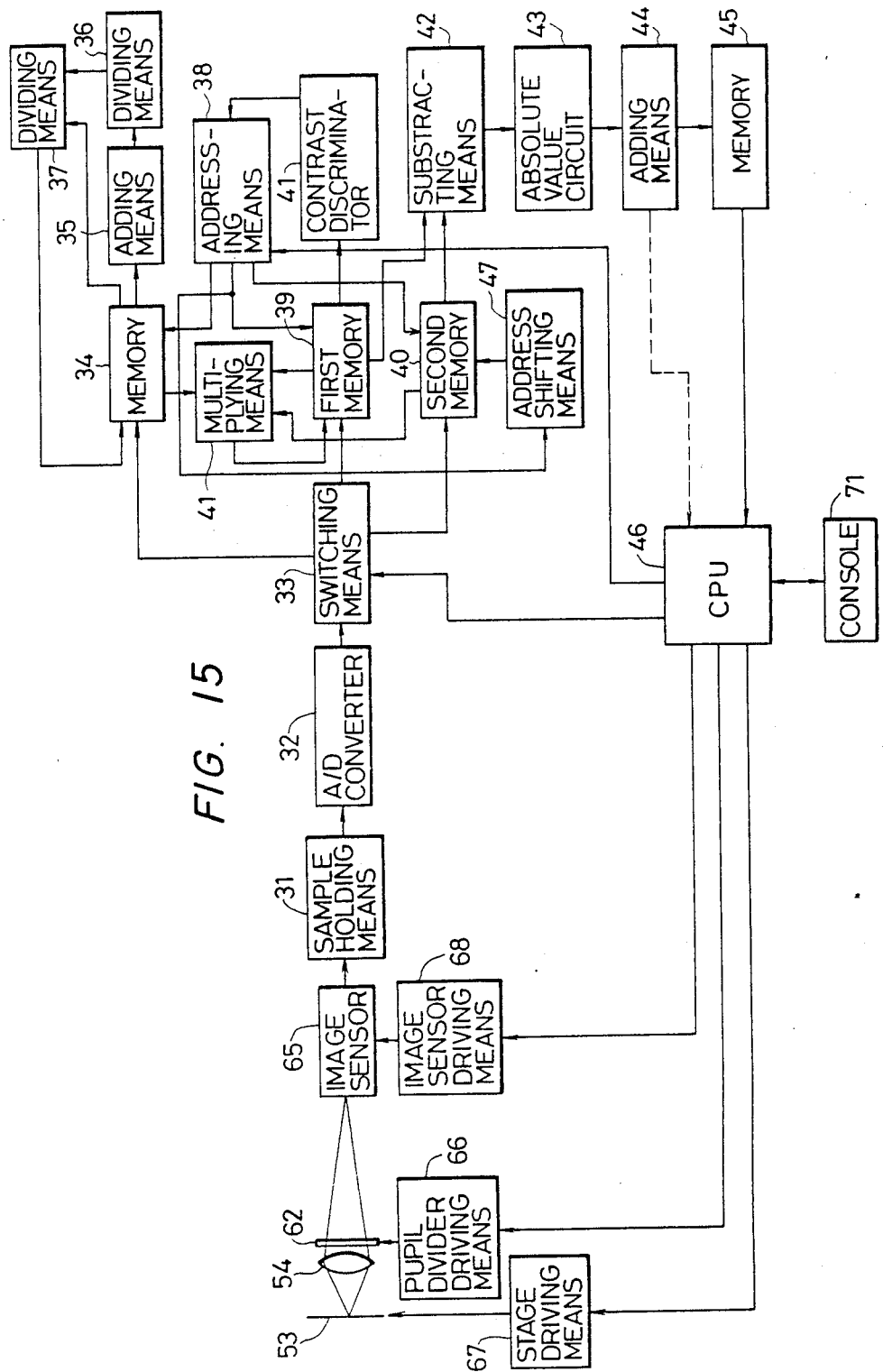
FIG. 15 is a block diagram showing a control and operation circuit of another embodiment of the present invention.

FIG. 15 shows the control-operation circuit of an example wherein others than the central processing unit are formed of hardware, as the second embodiment. This shall be explained in the following. First of all, the pupil divider driving means 66 works with the focusing starting signal from the console 71 and the image data A are obtained by the image sensor 65. The image sensor 65 starts picking-up of the images by means of the image sensor driving means 68 in synchronization with the pupil divider 62. At this time, in case the image sensor 65 is an accumulating type image sensor (generally, a solid state pickup device belongs to this type.), a vacant read-out is performed to erase once previously accumulated signals. The image data A continuously read out of the image sensor 65 is stored in a first memory 39 through a sample holding means 31, A/D converter 32 and switching means 33. Then the image data A are corrected by the correction coefficient data stored in advance in a memory 34 as described later and are again stored in the first memory 39. The correction coefficient data are made by multiplying the reciprocal numbers of the above described image data picked up by the image sensor with a uniform light incident in advance by the average value of the image data A and B obtained. Now, the case of the image sensor consisting of 512 elements shall be considered. The image data A and B consists of 1024 picture elements over 0 to 1023-elements. The image data A and B will be obtained respectively with 0 to 511-elements and 512 to 1023-elements. If the value of the n th element of the image data obtained with the uniform light where there is no sample is $x_n$, the correction coefficient $k_n$ of the element will be $$k_n = \frac{\sum_{n=0}^{1023} x_n}{\frac{1024}{x_n}}$$

When the image data A are then stored in the first memory 39, the pupil divider 62 will be in the state of taking the image data B and the image data B will be corrected and stored in a second memory 40 in the same manner as in the image data A.

Here, how to make the correction coefficient shall be explained. First, the light source 51 is lighted up under the state which no sample is placed on the stage 53 and the brightness of light source 51 is adjusted to obtain a proper illuminating condition. In this state, when a correction operating switch not illustrated is closed, a control signal will be put in the pupil divider driving means 66 from the central processing unit 46 to rotate the pupil divider 62, for example, to the position shown in FIG. 4A. In this state of the pupil divider 62, the uniform light passed through the upper half of pupil 9 will enter on the image sensor 65. On the other hand, the image sensor 65 is operated through the image sensor driving means 68 by a control signal from the central processing unit 46 to read out the image signal accumulated in the image sensor 65. Thus read-out image signal is held by the sample holding means 31 and converted into digital signals by the A/D converter 32. On the other hand, the switching means 33 connects the A/D converter 32 to a memory 34 having two areas by a control signal from the central processing unit 46. Accordingly, the image data digitized by the A/D converter 32 will be stored in the first area of the memory 34. The first area of the memory 34 has memory cells equal in number to picture elements of the image sensor 65 and therefore the signals from the respective elements are stored respectively in the respective corresponding cells. Next, the pupil divider 62 is rotated by 180° through the pupil divider driving means 66 by a control signal from the central processing unit 46 to thereby make the light passed through the lower half of pupil 9 enter on the image sensor 65. The image data by this light are stored in the second area of the memory 34 in the same manner as described above. In this embodiment, as number of the picture elements is 512, the image data stored in the first area of the memory 34 can be expressed as $X_0, \ldots, X_{511}$ and the image data stored in the second area of the memory 34 as $X_{512}, \ldots, X_{1023}$. The data stored in the memory 34 will be read out in turn from the first and second areas by instructions from an addressing means 38 to be operated by control signals from the central processing unit 46 and total sum $\Sigma X_i$ is calculated by an adding means 35. This total sum $\Sigma X_i$ is divided by a predetermined number of data n (n=1024 in this embodiment) through a dividing means 36 and, as a result, $\Sigma X_i/n$ is put in another dividing means 37. On one hand, at first, the addressing means 38 reads out the data $X_0$ from the first area of the memory 34, make the data $X_0$ put in the dividing means 37 to calculate $k_0 = (\Sigma X_i/n)/X_0$ and then make this $k_0$ store in the number "0" of the first area of the memory 34. Next, the reads out the data $X_1$ from the first area of the memory 34, make the data $X_1$ put in the dividing means 37 to calculate $k_1 = (\Sigma X_i/n)/X_1$ and then make this $k_1$ store in the number "1" of the first area of the memory 34. The same calculation will be repeated hereinafter to respectively store the correction coefficients $k_0, \ldots, k_{1023}$ in all addresses of the memory 34. Thus, a sample or object will be placed on the stage 53 after the storage of the correction coefficient data in the memory 34 has ended, and a focus detecting operation switch not illustrated will be closed by a control signal from the central processing unit 46 to commence a correcting operation for the image data. That is to say, with the closure of the focus detecting operation switch, the pupil divider 62 will be again rotated. The image signals accumulated in the image sensor 65 will be digitized through the A/D converter 32 in synchronization with this rotation of the pupil divider 62 and will be stored alternately in the first and second memories 39 and 40 by the switch-over action of the switching means 33 which is controlled by the central processing unit 46 in synchronization with reading-out of the image sensor 65. Thus, when the image date are stored in the memories 39 and 40, the addressing means 38 designates the number "0" of the first area of the memory 34 and the number "0" of the first memory 39 by instructions from the central processing unit 46 to read out the data stored in advance there, to calculate $k_0 \times D_0$ ($D_0$ represents the image data of the number "0".) in a multiplying means 41 and to store again the resultant in the number "0" of the memory 39. Thus stored resultant will have a value of the image data corrected with the correction coefficient. If the above mentioned operation is carried out on all addresses of the first memory 39, all of the data stored in the memory 39 will be corrected image data. Next, the addressing means 38 will designate the number "512" of the second area of the memory 34 and the number "0" of the second memory 40 to calculate $k_{512} \times D_{512}$ ($D_{512}$ represents the image data of the number "512".) and to store again the resultant in the number "0" of the memory 40. Therefore, if this operation is carried out on all addresses of the second memory 40, all image data stored in the memory 40 will be corrected. The corrected data stored in the first memory 39 in the way as described above for the respective sections shown in FIG. 6 will be sent in turn to a contrast discriminator 41 and the block to be used will be determined by the height of the contrast. Now, in case the contrast of the block B is the highest, the number 128 will be given to the addressing means 39. When the initial value of $-32$ is an address shifting means 47 and the addressing means 38 designates the address 128 in the first memory 39, the address shifting means 47 will designate the address 96 in the second memory 40. Then, the image data $f_A(128)$ and $f_B(96)$ will be put into a subtracting means 42 and the operation of $|f_A(128) - f_B(96)|$ will be carried out through the absolute value circuit 43. Then the image data $|f_A(128) - f_B(96)|$ will be stored in a memory 45 through an adding means 44. When the above is finished, the addressing means 38 will designate the address 129 in the memory 39, the address shifting means 47 will designate the address 97 in the memory 40, thereafter the operation will be performed in the same manner, $|f_A(129) - f_B(97)|$ will be added to the previous data $|f_A(128) - f_B(96)|$ by the adding means 44 and will be stored in the memory 45. Thereafter, this operation will be repeated until the address 255 of the first memory 39 and the correlation operation $$R(-32) = \sum_{x=128}^{255} ABS \{f_A(x) - f_B(x - 32)\}$$

will be completed. When this computation is completed, the value of the address shifting means 47 will be $-31$ and $$R(-31) = \sum_{x=128}^{255} ABS \{f_A(x) - f_B(x - 31)\}$$

will be computed. Then, this will continue until the value of the address shifting means 47 becomes 31 and the entire correlation operation $$R(\delta) = \sum_{x=128}^{255} ABS \{f_A(x) - f_B(x + \delta)\} \quad -32 \leq \delta \leq 31$$

will be carried out. Then the correlation $R(\delta)$ in the memory 45 will be compared by the central processing unit 46 and $\delta$ at which the correlation $R(\delta)$ is minimum will be found and will be made the phase difference amount of the image. Accordingly, the stage driving means 67 will be driven for focusing.

By the way, in case the de-focus amount is so large that the phase difference amount of $-32 \leq \delta \leq 31$ is short, the addressing means 38 will designate the address 128 in the first memory 39 and the initial value of the address shifting means 47 will be $-64$. Whenever the respective correlation computations end, 2 will be added and the computations $$R(-64) = |f_A(128) - f_B(128 - 64)| +$$
$$|f_A(130) - f_B(130 - 64)| + \ldots + |f_A(382) - f_B(382 - 64)|$$

$$R(-62) = \ldots$$

$$\vdots$$

$$R(60) = \ldots$$

will be carried out. This will correspond to using the image data every element and the detecting range of the phase difference between the images will become twice as large with the same computation amount but the focusing precision will be $\frac{1}{2}$.

As in the above, the phase difference between two images is computed and the stage driving means 67 is driven for focusing. The above mentioned operation may be repeated several times for accurate focusing. By the way, the console 71 indicates the start of focusing and the in-focus state.

By the way, it is needless to say that the present invention can be applied also to an automatic focus detecting device using two image sensors.

I claim:

1. A data correcting device in an automatic focus detecting system in which a focus detection is effected by the provision of a pupil dividing means adjacent to a pupil of an image forming lens for forming object images, by the reception of two individual object images formed by different light paths and separated by the pupil dividing means on a photoelectric converting means comprising a plurality of picture elements for the generation of output signals which correspond to the amount of light received by the picture elements for converting the two object images into corresponding photoelectric output signals, and which is effected by the detection of the relative position of the two object images by the utilization of the photoelectric output signals, wherein said data correcting device comprises a means for calculating the reciprocal numbers of the photoelectric output signals corresponding to the respective picture elements, said reciprocal numbers being obtained by the application of light with a uniform brightness distribution on to said photoelectric converting means, said data correcting device further comprising a means for multiplying the photoelectric output signals with the reciprocal values obtained from the respective picture elements in order to correct the photoelectric output signals of the photoelectric converting means.

2. A data correcting device according to claim 1, wherein said device features a means for calculating the mean value of the photoelectric output signals that are obtained by the application of light with a uniform brightness distribution on to the photoelectric converting means, and the mean value is multiplied with the photoelectric output signals for the focus detection together with the reciprocal values.

3. An automatic focus detecting device according to claim 1 or 2 wherein said detecting device further comprises a filter for cutting infrared rays arranged before said photoelectric converting means.

4. An automatic focus detecting device according to claim 1 or 2, wherein said detecting device further comprises a band pass filter arranged before said photoelectric converting means.

* * * * *